United States Patent
Allione et al.

(10) Patent No.: US 10,195,802 B2
(45) Date of Patent: Feb. 5, 2019

(54) METHOD FOR CONTROLLING A MANUFACTURING DEVICE USED IN AN OPTICAL LENS MANUFACTURING PROCESS

(71) Applicant: Essilor International, Charenton le Pont (FR)

(72) Inventors: Pascal Allione, Charenton le Pont (FR); Stephane Gueu, Charenton le Pont (FR); Cyril Guilloux, Charenton le Pont (FR); Christophe Jeannin, Charenton le Pont (FR); Loic Quere, Charenton le Pont (FR)

(73) Assignee: Essilor International, Charenton-le-Pont (FR)

( * ) Notice: Subject to any disclaimer, the term of this patent is extended or adjusted under 35 U.S.C. 154(b) by 169 days.

(21) Appl. No.: 14/783,014

(22) PCT Filed: Apr. 16, 2014

(86) PCT No.: PCT/EP2014/057817
§ 371 (c)(1),
(2) Date: Oct. 7, 2015

(87) PCT Pub. No.: WO2014/173781
PCT Pub. Date: Oct. 30, 2014

(65) Prior Publication Data
US 2016/0046090 A1     Feb. 18, 2016

(30) Foreign Application Priority Data
Apr. 23, 2013  (EP) .................................. 13305529

(51) Int. Cl.
*G02C 3/00* (2006.01)
*G02C 7/00* (2006.01)
(Continued)

(52) U.S. Cl.
CPC .... *B29D 11/00961* (2013.01); *G02B 27/0012* (2013.01); *G02C 7/024* (2013.01)

(58) Field of Classification Search
CPC ........ B29D 11/00961; B29D 11/00932; B29D 11/00192; B29D 11/00201;
(Continued)

(56) References Cited

U.S. PATENT DOCUMENTS

| 4,980,993 A | 1/1991 | Umezaki |
| 5,452,031 A | 9/1995 | Ducharme |

(Continued)

*Primary Examiner* — Mustak Choudhury
(74) *Attorney, Agent, or Firm* — Oblon, McClelland, Maier & Neustadt, L.L.P.

(57) ABSTRACT

A method for controlling a manufacturing device used in an optical lens manufacturing process. The method including providing optical lens data, the optical lens data representing the nominal and effective values of at least one optical lens parameter of an optical lens manufactured according to a manufacturing process using a manufacturing device, providing manufacturing data identifying at least the manufacturing device used to manufacture the optical lens, determining the difference between the nominal and effective values of the at least one optical lens parameter of the optical lens, determining a recommended value of a manufacturing parameter of the manufacturing device identified by the manufacturing data, the recommended value of the manufacturing parameter being determined based on the difference between the nominal and effective values of the at least one optical lens parameter.

10 Claims, 2 Drawing Sheets

(51) Int. Cl.
  *G02C 7/02* (2006.01)
  *B29D 11/00* (2006.01)
  *G02B 27/00* (2006.01)

(58) Field of Classification Search
  CPC ........ B29D 11/00317; B29D 11/00413; B29D 11/00432; B29D 11/00528; B29D 11/00538; B29D 11/00038; B29D 11/00048; G02C 7/02; G02C 7/024; G02C 7/04; G02C 7/021; G02C 7/022; G02C 7/027; G02C 7/028; G02C 7/047–7/049; G02B 27/0012; G05B 19/4097; G05B 19/41875; B24B 13/0025; B24B 13/06; B24B 51/00; B24B 1/00; G01M 11/0242; G06F 17/5009; A61B 3/0025; A61B 3/18; A61B 3/0285; A61B 3/1015; A61B 3/103
  USPC ......... 351/159.74, 223, 246, 159.01, 159.02, 351/159.08, 159.14, 159.7, 159.73, 205, 351/211; 451/5, 43, 70, 279, 317; 700/28, 32, 108–110, 116, 216; 702/81, 702/82, 84, 115
  See application file for complete search history.

(56) References Cited

U.S. PATENT DOCUMENTS

| | | | |
|---|---|---|---|
| 6,522,939 B1* | 2/2003 | Strauch | G05B 19/41875 700/116 |
| 2001/0050752 A1* | 12/2001 | Shirayanagi | G02C 7/02 351/159.74 |
| 2004/0085650 A1 | 5/2004 | Fendt et al. | |
| 2013/0084778 A1 | 4/2013 | Lavrador et al. | |
| 2013/0100410 A1* | 4/2013 | Liang | A61B 3/18 351/223 |

* cited by examiner

METHOD FOR CONTROLLING A MANUFACTURING DEVICE USED IN AN OPTICAL LENS MANUFACTURING PROCESS

RELATED APPLICATIONS

This is a U.S. national stage application under 35 USC § 371 of International application No. PCT/EP2014/057817, filed on Apr. 16, 2014. This application claims the priority of European application no. 13305529.3 filed Apr. 23, 2013, the entire content of which is hereby incorporated by reference.

FIELD OF THE INVENTION

The invention relates to a method implemented by computer means for controlling a manufacturing device used in an optical lens manufacturing process, a method of manufacturing an optical lens and a computer program product.

BACKGROUND OF THE INVENTION

The discussion of the background of the invention herein is included to explain the context of the invention. This is not to be taken as an admission that any of the material referred to was published, known or part of the common general knowledge at the priority date of any of the claims.

An optical lens is typically made of plastic or glass material and generally has two opposite surfaces which co-operate with one another to provide a required corrective prescription. When the positioning or shape of one of these surfaces with respect to the other is inaccurate, optical errors can be created.

Optical lenses, and in particular ophthalmic lenses, require very high quality manufacturing process in order to obtain high quality optical lenses.

A lens manufacturing process comprises a great number of steps. Considering the overall quality requirement, a slight quality deficiency in one of the steps of the manufacturing process can have a great impact on the overall quality of the manufactured optical lens.

Although controlling the quality of the produced lenses is a complex task, lens manufacturers need to control the quality of the produced lenses, at least to check the conformity of the produced lenses with quality standards.

When a produced lens does not meet the quality requirements of the standard, the lens is set aside and a new lens is produced.

Producing lenses that are finally set aside is time consuming and costly for the lens manufacturer. Therefore, there is a general need for reducing the number of produced lenses that do not meet the quality requirements.

Quality deficiency of a produced lens is most of the time linked to either an operator deficiency or at least one manufacturing parameter of one of the manufacturing device that is incorrect.

Considering the number of operator interventions, the number of manufacturing parameters involved in an optical lens manufacturing process and that almost each produced lens is unique, it is very difficult for a lens manufacturer to properly identify the origin of the quality deficiency he may observe for a specific lens.

SUMMARY OF THE INVENTION

One object of the present invention is to provide a method for controlling a manufacturing device used in an optical lens manufacturing process that allows identifying the origin of a quality deficiency identified on a manufactured optical lens.

To this end, one aspect of the invention is directed to a method, for example implemented by computer means, for controlling a manufacturing device used in an optical lens manufacturing process, the method comprising:

an optical lens data providing step, during which optical lens data is provided, the optical lens data represents the nominal and effective values of at least one optical lens parameter of an optical lens manufactured according to a manufacturing process using a manufacturing device, a manufacturing data providing step during which manufacturing data identifying at least the manufacturing device used to manufacture the optical lens is provided, a difference determining step during which the difference between the nominal and effective values of the at least one optical lens parameter of the optical lens is determined, a manufacturing device parameter determining step during which a recommended value of a manufacturing parameter of the manufacturing device identified by the manufacturing data is determined, the recommended value of the manufacturing parameter is determined based on the difference between the nominal and effective values of the at least one optical lens parameter.

Advantageously, the method according to an embodiment of the invention allows determining at least one manufacturing parameter to be adjusted. Furthermore, the method according to an embodiment of the invention allows determining a recommended value of such manufacturing parameter.

Such method allows the lens manufacturer to link the difference between the nominal and effective values of at least one optical parameter and a manufacturing device parameter. Therefore, the method according to the invention may be used by the lens manufacturer not only to correct a quality deficiency but also to anticipate a quality deficiency by adjusting the manufacturing parameters to the recommended values.

According to further embodiments which can be considered alone or in any possible combination:

- the optical lens is manufactured at a manufacturing side and the method for controlling the manufacturing device is implemented at a controlling side, the controlling side being remote from the manufacturing side; and/or
- the method further comprises a feedback step during which the recommended value of the manufacturing parameter is sent to the manufacturing side; and/or
- the manufacturing data further comprises the value of at least one manufacturing parameter of the manufacturing device and the method further comprises:
  - a recording step during which the value of the at least one manufacturing parameter and the difference between the nominal and effective values of the at least one optical lens parameter of the corresponding optical lens are recorded, and
  - a relating step during which the different values of the at least one manufacturing parameter are related to the differences between the nominal and effective values of the at least one optical lens parameter of the corresponding optical lenses; and/or
- the optical lens is adapted for a wearer; and/or
- the at least one optical lens parameter is an optical and/or geometrical parameter of the optical lens and/or the weight of the optical lens; and/or the optical lens is a progressive addition lens and the least one optical lens parameter is an optical and/or a geometrical parameter in the far and/or the near vision zone; and/or the optical lens parameter is measured using a foccimeter; and/or the optical lens parameter is measured using an optical mapping device; and/or the optical lens parameter is obtained by using an image of a specific pattern through the optical lens; and/or the manufacturing device is selected in the list consisting of surfacing devices, polishing devices, edging devices, molding devices, additive manufacturing devices, blocking devices, and mounting devices.

Another aspect of the invention relates to a method of manufacturing an optical lens using at least one manufacturing device, wherein the method of manufacturing is remotely controlled by a method according to an embodiment of the invention.

According to a further aspect, the invention relates to a computer program product comprising one or more stored sequences of instructions that are accessible to a processor and which, when executed by the processor, causes the processor to carry out the steps of the method according to the invention.

Another aspect of the invention relates to a computer readable medium carrying one or more sequences of instructions of the computer program product according to an embodiment of the invention.

Another aspect of the invention relates to a program which makes a computer execute the method according to an embodiment of the invention.

Another aspect of the invention relates to a computer-readable storage medium having a program recorded thereon; where the program makes the computer execute the method according to an embodiment of the invention.

Another aspect of the invention relates to a device comprising a processor adapted to store one or more sequence of instructions and to carry out at least one of the steps of the method according to an embodiment of the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Non limiting embodiments of the invention will now be described with reference to the accompanying drawings in which.

DETAILED DESCRIPTION OF THE DRAWINGS

Figure 1:
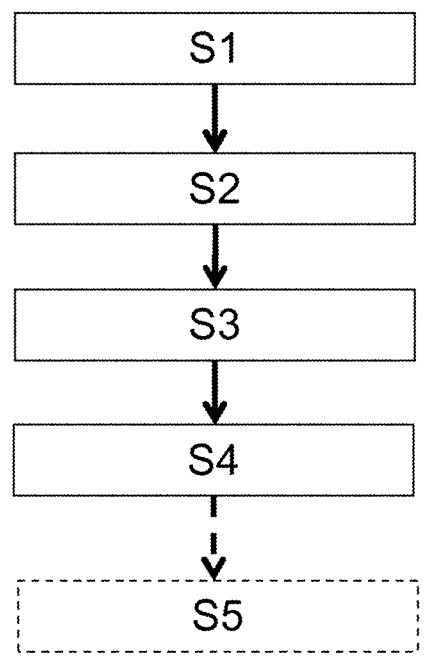
FIG. 1 is flowchart representing the steps of a method according to an embodiments of the invention.

According to an embodiment of the invention illustrated on FIG. 1, the method for controlling a manufacturing device used in an optical lens manufacturing process comprises:

an optical lens data providing step S1,
a manufacturing data providing step S2,
a difference determining step S3, and
a manufacturing device parameter determining step S4.

The manufacturing device controlled by the method of the invention, can be of any type that is used in the manufacturing process of an optical lens. For example the manufacturing device may be one or a plurality of devices selected in the list consisting of surfacing devices, polishing devices, edging devices, molding devices, additive manufacturing devices, blocking devices. The method according to the invention may also be used to control mounting devices.

Although, the whole method of the invention may be implemented at the lens manufacturer side, according to an embodiment of the invention the method of the invention is a remote control method in the sense that it involves a controlling step carried out in a different place than the manufacturer side.

In other words, according to an embodiment of the invention, the optical lens is manufactured at a manufacturing side whereas the method for controlling the manufacturing device is implemented at a controlling side, the controlling side being remote from the manufacturing side.

Advantageously, such embodiment of the invention allows a centralized control of different manufacturing devices, thus reducing the need of quality control expertise at the manufacturer side and an increase expertise at the controlling side that may collect data from different manufacturing sides. Therefore, the overall cost of the manufacturing process may be reduced while increasing the quality of the control of the manufacturing devices and of the manufactured optical lenses.

In the following detailed description of the invention, the method of the invention is described as a remote control method although such method could be implemented at the manufacturer side.

Figure 2:
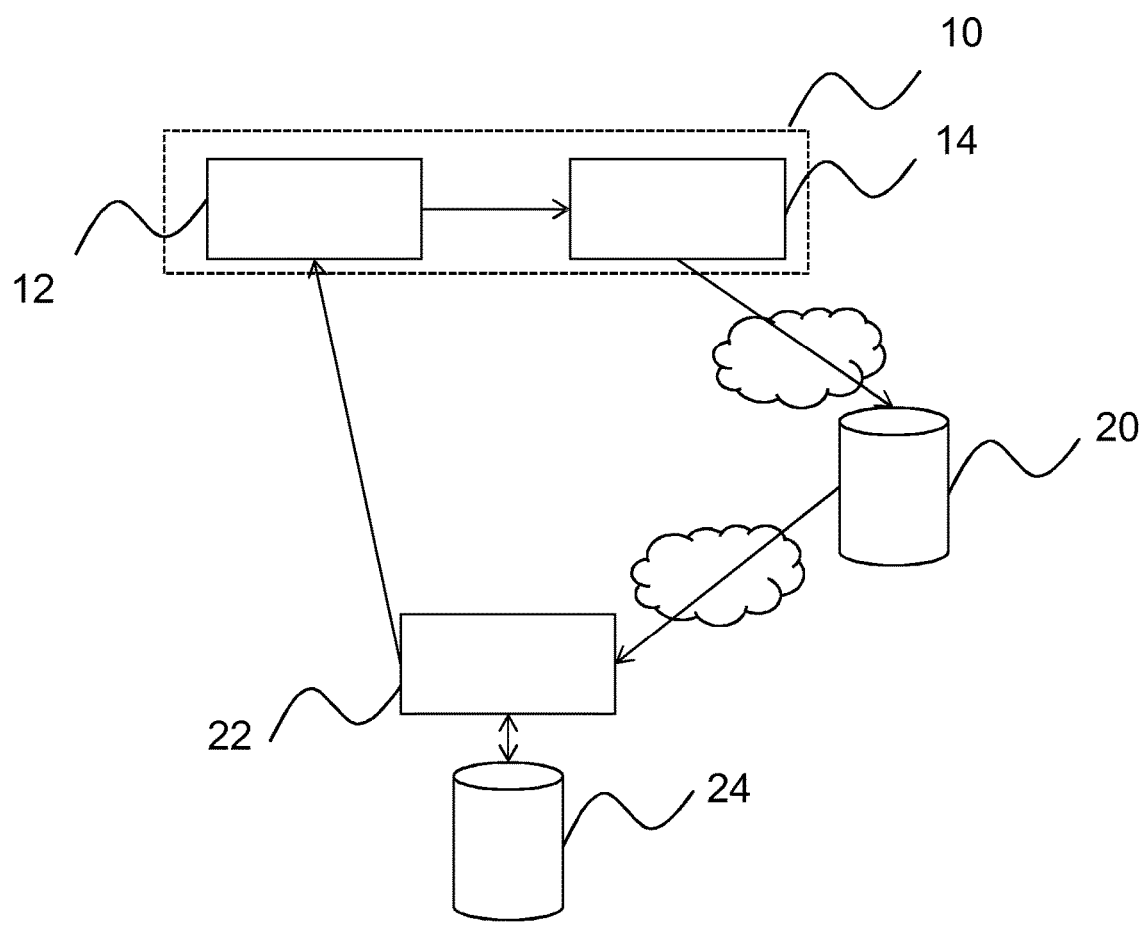
FIG. 2 represents a system implementing the method according to the invention.

As illustrated on FIG. 2, an optical lens is manufactured using a manufacturing device 12 at a lens manufacturer side 10.

During the optical lens data providing step S1, optical lens data is provided to the manufacturing device.

The optical lens data represents the nominal and effective values of at least one optical lens parameter of an optical lens manufactured according to a manufacturing process using a manufacturing device.

The optical lens parameter can be an optical and/or geometrical and/or the weight of the optical lens.

In the following, one finds non-limiting examples of such geometrical parameter: local height (z), local curvature, local sphere value, local cylinder, local cylinder axis, local thickness, local prism, . . . , as a minimum value, maximum value or mean value over the whole surface, or as a local derivation (slope, gradient, . . . );

In the following, one finds non-limiting examples of such optical parameter: local ray deviation, local power, local astigmatism, astigmatism axis orientation, un local magnification (evaluated from a foccimeter or by a wearer . . . ), as a minimum value, maximum value or mean value over the whole surface, or as a local derivation (slope, gradient, . . . ).

The effective value of the optical lens parameter can be measured at the manufacturing side 10 using measuring means 14.

Such measurement can be done directly by using measuring means such as a foccimeter or an optical mapping device for optical parameters.

The geometrical parameters can be measured using any type of surface measuring means such as mechanical sensors.

The weight of the optical lens may be measured by using a scale.

The effective value of the optical lens parameter may be deduces from an indirect measure. For example, an image of a specific pattern trough the manufactured optical lens may be provided. From the deformation of the image of a specific pattern trough the manufactured optical lens it is possible to determine the effective value of some parameters of the manufactured optical lens.

The nominal value of the optical parameter corresponds to the target value of the optical lens parameter. Such value corresponds to the desired value for such parameter.

During the manufacturing data providing step manufacturing data identifying at least the manufacturing device used to manufacture the optical lens is provided.

The manufacturing data may identify the manufacturing device itself or may provide a reference of the type of manufacturing device. Advantageously, more precisely the manufacturing device is identified the more relevant and accurate the method of the invention may be.

According to an embodiment, the effective value and the manufacturing data may be sent directly to the controlling side 22.

According to an alternative embodiment of the invention, the manufacturing data and the effective value of the optical lens parameter may be sent to a remote storing entity 20 together with an identifier of the manufactured lens.

According to a further embodiment, the effective value of the optical lens parameter is determined at the controlling side. The manufacturing side sends either to the remote storing entity or to the controlling side data relating to measurements carried out on the optical lens. For example, the manufacturing side may send a picture of one of the surfaces of the optical lens in specific conditions. The value of the effective optical parameter may be determined from such picture at the controlling side.

The nominal value of the optical lens parameter may be sent from the manufacturing side directly to the controlling side or via the remote storing entity, for example, in response to a data request including the identifier.

According to an alternative embodiment, the controlling side may receive the nominal value directly from an optical lens designer or may be the lens designer himself.

During the difference determining step S3, the difference between the nominal and effective values of the optical lens parameter is determined. The difference determining step is preferably carried out at the controlling side 22.

During the manufacturing device parameter determining step S4, a recommended value of at least one manufacturing parameter of the manufacturing device identified by the manufacturing data is determined.

The recommended value of the manufacturing parameter is determined based on the difference between the nominal and effective value of the optical lens parameter. The recommended value is specific to the manufacturing device used for manufacturing the lens. Therefore, the more precisely the manufacturing device is identified by the manufacturing data the more accurate the recommended value may be.

To determine a recommended value, the controller at the controlling side 22 may use a database 24 of differences between the nominal and effective values of the optical lens parameter and there relation with manufacturing parameters.

For example, the wear of the polishing tool used in the optical lens manufacturing process can be detected by controlling an image of the manufactured surface of the optical lens with an arc lamp. Indeed, signs of the machining tool observed on the surface using an arc lamp can be related to the need of changing the polishing tool.

In such case, although the manufactured optical lens may fulfill the standard quality requirements, the controlling side could recommend changing the polishing tool. Therefore, avoiding that further optical lens manufactured using the same polishing device would not fulfill the standard quality requirements.

According to a further example, the wear of the machining tool used in the optical lens manufacturing process can be detected by controlling the image of the manufactured surface of the optical lens with an arc lamp. Indeed, dark rings can be observed on the surface using an arc lamp when the machining tool is starting to wear out.

In such case, although the optical lens may fulfill the standard quality requirements, the controlling side could recommend changing the machining tool. Therefore, avoiding that further optical lens manufactured using the same machining device would not fulfill the standard quality requirements.

According to a further example, a deviation of the temperature of the polishing bath can be detected by controlling the polished surface. If said temperature is too high or too low, it generates either a lack of polishing or an "over-polishing" causing an undesired deformation of the surface.

In such case, although the optical lens may fulfill the standard quality requirements, the controlling side could recommend checking the temperature of the polishing bath used in polishing operation.

According to an embodiment of the invention, the controlling side recommendation can comprise different level of recommendation. Such level of recommendation may provide an indication of the percentage of risk that further optical lenses manufactured by such device would not fulfill the standard quality. Such level of recommendation may be determined based on the difference between the effective and nominal value of the optical lens parameter and on the complexity indication of the surface of the manufactured optical lens.

According to an embodiment of the invention, the manufacturing data further comprises the value of at least one manufacturing parameter of the manufacturing device and the method further comprises:
 a recording step, and
 a relating step.

During the recording step the value of the at least one manufacturing parameter and the difference between the nominal and effective values of the at least one optical lens parameter of the corresponding optical lens are recorded.

During the relating step, the different values of the manufacturing parameter are related to the differences between the nominal and effective values of the at least one optical lens parameter of the corresponding optical lenses.

Advantageously, such embodiment allows determining links between optical parameters and manufacturing device parameter. Furthermore, such embodiment allows determining a drift of a parameter of the manufacturing device. Indeed, a drift in the difference between the effective and nominal value of the optical lens parameter is an indication of the drift of at least one manufacturing parameter from its nominal value. Upon detection of such drift the controlling side may inform the manufacturing side that an action is to be carried out to correct the manufacturing parameters.

As illustrated on FIG. 1, the method according to the invention may comprise a feedback step S5 during which the recommended value of the manufacturing parameter is sent to the manufacturing side.

The invention has been described above with the aid of embodiments without limitation of the general inventive concept.

While in the embodiments described in detail the method of controlling is carried out remotely, the method may be carried out at the manufacturing side.

Furthermore, while in the detail description the controlling side controls one manufacturing side, the method according to the invention allows a controlling side to control a plurality of manufacturing sides. The manufacturing side could also have address to different controlling sides. The chose between the different controlling sides could be based on the type of manufacturing device to be controlled and/or the design of the manufactured optical lens.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method implemented by processing circuitry for controlling a manufacturing device used in an optical lens manufacturing process, the method comprising the following steps:

an optical lens data providing step, during which optical lens data is provided, the optical lens data represents the nominal and effective values of at least one optical lens parameter of an optical lens manufactured according to a manufacturing process using a manufacturing device, the optical lens being adapted for a wearer;
 a manufacturing data providing step during which manufacturing data identifying at least the manufacturing device used to manufacture the optical lens is provided, the manufacturing data further comprising a value of at least one manufacturing parameter of the manufacturing device;
 a difference determining step during which the difference between the nominal and effective values of the at least one optical lens parameter of the optical lens is determined;
 a manufacturing device parameter determining step during which a recommended value of the at least one manufacturing parameter of the manufacturing device identified by the manufacturing data is determined, the recommended value of the at least one manufacturing parameter is determined based on the difference between the nominal and effective values of the at least one optical lens parameter;
 a recording step during which the value of the at least one manufacturing parameter and the difference between the nominal and effective values of the at least one optical lens parameter of the corresponding optical lens are recorded;
 a relating step during which the different values of the at least one manufacturing parameter are related to the differences between the nominal and effective values of the at least one optical lens parameter of the corresponding optical lenses; and
 a transmitting step during which the recommended value of the at least one manufacturing parameter is transmitted to the manufacturing device to adjust the at least one manufacturing parameter to the recommended value.

2. The method according to claim 1, wherein the optical lens is manufactured at a manufacturing side and the method for controlling the manufacturing device is implemented at a controlling side, the controlling side being remote from the manufacturing side.

3. The method according to claim 1, wherein the at least one optical lens parameter is an optical and/or geometrical parameter of the optical lens and/or the weight of the optical lens.

4. The method according to claim 1, wherein the optical lens is a progressive addition lens and wherein the at least one optical lens parameter is an optical and/or a geometrical parameter in the far and/or the near vision zone.

5. The method according to claim 1, wherein the optical lens parameter is measured using a focimeter.

6. The method according to claim 1, wherein the optical lens parameter is measured using an optical mapping device.

7. The method according to claim 1, wherein the optical lens parameter is obtained by using an image of a specific pattern through the optical lens.

8. The method according to claim 1, wherein the manufacturing device is selected in the list consisting of surfacing devices, polishing devices, edging devices, molding devices, additive manufacturing devices, blocking devices, and mounting devices.

9. A method of manufacturing an optical lens using at least one manufacturing device, wherein the method of manufacturing is remotely controlled by the method according to claim 1.

10. A non-transitory computer readable medium including computer executable instructions, wherein the instructions, when executed by a computer, cause the computer to perform a method for controlling a manufacturing device used in an optical lens manufacturing process, the method comprising:

providing optical lens data, the optical lens data representing the nominal and effective values of at least one optical lens parameter of an optical lens manufactured according to a manufacturing process using a manufacturing device, the optical lens being adapted for a wearer;

providing manufacturing data identifying at least the manufacturing device used to manufacture the optical lens, the manufacturing data further comprising a value of at least one manufacturing parameter of the manufacturing device;

determining the difference between the nominal and effective values of the at least one optical lens parameter of the optical lens;

determining a recommended value of a manufacturing parameter of the manufacturing device identified by the manufacturing data, the recommended value of the manufacturing parameter being determined based on the difference between the nominal and effective values of the at least one optical lens parameter;

recording the value of the at least one manufacturing parameter and the difference between the nominal and effective values of the at least one optical lens parameter of the corresponding optical lens;

relating the different values of the at least one manufacturing parameter to the differences between the nominal and effective values of the at least one optical lens parameter of the corresponding optical lenses; and transmitting the recommended value of the at least one manufacturing parameter to the manufacturing device to adjust the at least one manufacturing parameter to the recommended value.

\* \* \* \* \*